June 12, 1951 A. N. MILSTER 2,556,287
HYDRAULIC BRAKE MECHANISM FOR TRACTOR STEERING
Filed Feb. 4, 1946

INVENTOR
ARTHUR N. MILSTER
BY
ATTORNEY

Patented June 12, 1951

2,556,287

UNITED STATES PATENT OFFICE 2,556,287

HYDRAULIC BRAKE MECHANISM FOR TRACTOR STEERING

Arthur N. Milster, Ferguson, Mo., assignor to Wagner Electric Corporation, St. Louis, Mo., a corporation of Delaware Application February 4, 1946, Serial No. 645,256

10 Claims. (Cl. 188—152)

1

This invention relates to tractor steering controls and one of the objects thereof is to provide a dual opposed piston cylinder construction in which the pistons may be selectively operable to selectively actuate either of the brake mechanisms on the tractor drive wheels to assist steering or they may be jointly operable to arrest traverse of the tractor.

Another object of the invention is to provide a dual opposed piston cylinder construction for producing pressure fluid to actuate the braking mechanism associated with the drive wheels of the tractor in which the piston cylinder devices may jointly operate said brakes to arrest vehicle motion and in which manual means are provided to enable the operator to cause the piston cylinder devices to become severally operable to assist the steering of the tractor.

Figure 1:
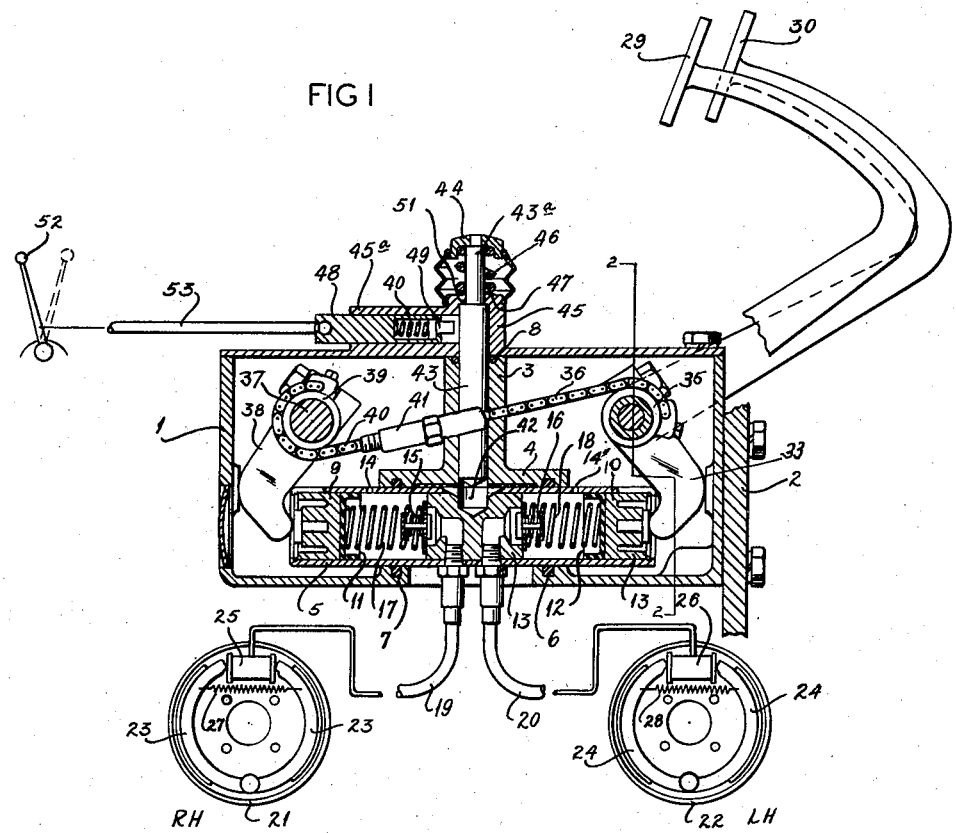
Figure 2:
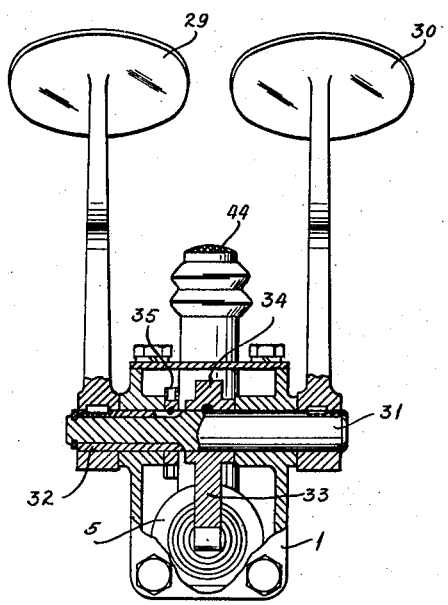

In the drawings Figure 1 shows a sectional elevational view of the brake control; and Figure 2 shows a sectional view along the line 2—2 of Figure 1.

A casing 1 suitably secured to the tractor frame 2 (only a portion of which is illustrated) has a member 3 suitably arranged therein which has a tubular formation 4 formed thereon in which a dual opposed master cylinder 5 is slidably received. The casing also serves as a reservoir for a suitable brake operating fluid. Suitable seals 6 and 7 are arranged in the tubular housing 4 to prevent leakage of brake operating fluid from casing 1 and a seal 8 may be arranged at the upper end for similar purposes. Arranged in each end of master cylinder 5 are pistons 9 and 10 provided with packing cups 11 and 12 and centrally disposed in master cylinder 5 is a member 13 which is fixed in the cylinder by brazing or welding to prevent relative axial motion of the member and cylinder and to prevent the passage of fluid from one end of the cylinder to the other. Compensating ports 14, 14' are formed in the cylinder walls in the positions indicated and valves 15 and 16, which may be similar in construction to those shown in United States Patent No. 2,214,045, issued September 10, 1940, are assembled in member 13, and springs 17 and 18 are disposed between piston packing cups 11 and 12 and the centrally disposed member 13. Valves 15 and 16 maintain fluid in the associated conduits and brake mechanisms under a light pressure. Member 13 has passageways formed therein, to which conduits 19 and 20 are connected, controlled by valves 15 and 16. The conduits lead to brake mechanisms 21 and 22 which have brake shoes 23 and 24 suitably pivoted on the backing plates of each brake mechanism and brake actuating motors 25 and 26 expand the brake shoes into engagement with a brake drum customarily associated with the brake mechanism. Suitable resilient members 27 and 28 are provided in each mechanism to restore the brake shoes to disengaged position.

The actuating means for each of the pistons 9 and 10 are pedals 29 and 30. Pedal 30 is secured to a shaft 31 rotatably mounted in suitable journals in casing 1. Pedal 29 is secured to a sleeve 32 telescoped on a reduced diameter portion of shaft 31. Arm 33 is formed on a member 34 which is secured to shaft 31 and is engageable with piston 10 in master cylinder 5. Sleeve 32 has a sprocket sector 35 rigidly secured thereto and a chain 36 has one end thereof connected to sprocket sector 35. A second shaft 37 is rotatably mounted in casing 1 in suitable journals and has an arm 38 connected thereto which is engageable with piston 9 in master cylinder 5. A sprocket sector 39 is rigidly secured to shaft 37 and chain 40 has one of its ends secured to the sprocket sector 39. A turnbuckle 41 connects the free ends of chains 36 and 40 and provides a means for adjusting the relative free positions of lever arms 33 and 38. The sprocket sectors may be eliminated and chains 36, 40 connected securely to wheels or similar constructions.

The centrally disposed member 13 has a cavity 42 formed therein and one end of a rod 43 axially movable in the supporting member 3 is insertable in cavity 42. Rod 43 extends above casing 1 and is provided with a reduced diameter end 43a which has a cap 44 secured thereto. A boss 45 is formed on casing 1 in the position shown in which shaft 43 moves. A spring 46 engages cap 44 and a shoulder 47 on boss 45 engages the other end of the spring, spring 46 normally urging the shaft to the position shown. A lateral extension 45a of the housing has a bore therein in which a member 48 is slidably received. A plug 49 is received in the bored end of member 48 and a spring 50 urges the plug to the position indicated in the drawings. The plug 49 is engageable with shoulder 51 on rod 43 and when said plug engages said shoulder, the opposite end of rod 43 will extend into cavity 42 formed in member 13. A speed control device 52 which is preferably a gear shift lever adjustable to a plurality of positions such as low, intermediate, high and reverse, customarily associated with tractor vehicles has a rod 53 connected thereto which also engages the movable member 48, there being a suitable socketed connection between rod 53 and said movable member. When the speed control device 52 is in certain positions of adjustment, preferably a low gear ratio position, the movable member 48 will be moved toward rod 43, and plug 49 under these conditions will move relatively axially of the movable member 48. When it is desired to lock the master cylinder 5 in position, rod 43 is depressed by the operator to cause its entry into socket 42 and when in proper position, plug 49 will engage shoulder 51 on shaft 43 to hold it in this position as long as the speed control device remains in the predetermined position.

The operation of this device to assist steering of the vehicle, which is customary during low traverse speed operation of the tractor, will require the operator to place the speed control device in the low speed position, shown by the dotted line position of device 52. When this is accomplished and the operator desires the assistance of the braking mechanisms to steer the tractor, he will depress rod 43 to cause the master cylinder 5 to be held rigidly in the cylinder holding member 4. When this has been accomplished the selective actuation of pedals 29 and 30 will selectively apply the brake mechanisms 21 and 22, the latter being associated with the right-hand and left-hand drive wheels, respectively, of the tractor. Depending upon the direction it is desired to turn the tractor, brakes 21 and 22 will be applied so that the drive wheel associated with the respective braking mechanism will be held stationary or be allowed to rotate, it being assumed that brake mechanism 21 for the right-hand wheel will be held stationary when it is desired to turn to the right, and when it is desired to turn to the left, the brake mechanism 22 will be applied.

During the high speed operations of the vehicle, it will not be possible to selectively actuate the brakes because the speed control device will have withdrawn the movable member 48 and plug 49 associated therewith from engagement with rod 43 enabling spring 46 to lift it to the position illustrated in Figure 1. In this condition of operation, actuation of either brake pedal 29 or 30 will apply both brakes to stop the vehicle. This will be caused by reason of the fact that when pedal 30, for example, is depressed its associated arm 33 will force piston 10 into master cylinder 5 closing compensating port 14' and because master cylinder 5 may now move relatively to the holding member 4, compensating port 14 will also be closed since arm 38 is held stationary against the end of casing 1 and as master cylinder 5 moves relatively to the tubular holding member 4 it will of necessity move relatively to piston 9. The force applied to piston 10 will, therefore, cause pressure fluid to be developed in both ends of the master cylinder and at equal pressures to be forced past the valve mechanisms 15 and 16 into both brake cylinders 25 and 26.

Suitable slots are formed in the ends of master cylinder 5 to permit arms 33 and 38 to move pistons 9 and 10. A suitable slot is formed in the lower portion of housing 1 to permit conduits 19 and 20 secured to master cylinder 5 to move relatively to casing 1. Since both compensating ports 14 and 14' have been covered because of the relative motion of master cylinder 5 with respect to both pistons 9 and 10, it is believed clear that there is no loss of pressure fluid from the master cylinder when the pistons are actuated by either of the pedals 29 or 30. It is further obvious that if brake pedal 29 should be depressed, the action described above will occur because arm 33 will be prevented from moving by engaging with the end of casing 1 resulting in relative motion between piston 10 and master cylinder 5, piston 9 being moved by arm 38, thereby causing both brakes to be actuated simultaneously and at the same pressure in the manner previously set forth.

Having fully described my invention, that which I claim as novel and desire to protect by Letters Patent of the United States is:

1. A brake control comprising a casing; a cylinder; means to support said cylinder in said casing for movement along its longitudinal axis; a piston in each end of said cylinder; means in said cylinder to divide it into two chambers; brake actuating means connected to each chamber; a brake mechanism operable by each actuating means; an actuator for each piston; a brake pedal for each actuator; and means to lock said cylinder against axial movement, said pistons being selectively operable by said pedals respectively when said cylinder is locked in position, and said pistons being jointly operable by either brake pedal when said cylinder is axially movable.

2. A brake control comprising a casing; a cylinder; means to support said cylinder in said casing for movement along its longitudinal axis; a piston in each end of said cylinder; a fixed wall in said cylinder dividing it into two non-communicating chambers; a brake motor connected to each chamber; a brake mechanism operable by each motor; an actuator for each piston; a brake pedal for each actuator; means to support said brake pedals in said casing on a common axis of rotation; a speed control device adjustable to a plurality of positions; and manually operable means operatively connected to said device to lock said cylinder against axial movement during a predetermined position of adjustment of said device to enable said pistons to be selectively operable, said pistons being jointly operable by either brake pedal when said device is in other positions of adjustment to permit movement of said cylinder along its longitudinal axis.

3. A brake control comprising a casing; a cylinder; means to support said cylinder in said casing for movement along its longitudinal axis; a piston in each end of said cylinder; a wall in said cylinder to divide it into two non-communicating chambers; brake actuating means operatively connected to each chamber; a brake mechanism to be operated by each actuating means; means to lock said cylinder against said axial movement; and means to individually actuate each piston to thereby individually actuate each brake actuating means when said cylinder is locked in position and to jointly actuate said pistons to thereby jointly actuate each brake actuating means when said cylinder is capable of movement along its longitudinal axis.

4. A brake control comprising a casing; a cylinder; means to support said cylinder in said casing for movement along its longitudinal axis; a piston in each end of said cylinder; means in said cylinder to divide it into two chambers; a brake motor connected to each chamber; a brake mechanism operable by each motor; an operating arm for each piston; a brake pedal for each operating arm; means to support said brake pedals for rotation about a common axis; and means to lock said cylinder in position, said pistons being individually operable by the pedals respectively when said cylinder is locked in position, and said pistons being jointly operable by either brake pedal when said cylinder is capable of movement along its longitudinal axis.

5. A brake control comprising a housing; a cylinder; means in said housing to slidably support said cylinder for movement along its longitudinal axis; pistons arranged in both ends of said cylinder; piston operating arms supported in said housing; manually-operated members for each of said piston operating arms; a speed controlling device adjustable to a plurality of positions; means selectively engageable with said cylinder to prevent longitudinal movement thereof; and means connecting said speed controlling device and said last mentioned means to prevent longitudinal movement of said cylinder in one position of adjustment of said speed control device to thereby enable said pistons to be selectively operable, and when said speed controlling device is in other positions of adjustment said cylinder is axially movable in said casing so that both of said pistons may be simultaneously operated by either of said manually-operated members.

6. A brake control comprising a brake assembly for each traction element of a vehicle; a casing; a two chamber cylinder, each chamber operatively associated with one brake assembly; means mounting said cylinder in said casing for longitudinal movement along its major axis; a piston slidably mounted in each chamber in said cylinder; individual actuating means for each piston; and selectively operable means constructed and arranged for engaging said cylinder for preventing longitudinal movement thereof for permitting said pistons to be selectively or simultaneously operated by said piston actuating means, simultaneous actuation being produced by either of said piston actuating means when said cylinder is free to slide in said casing.

7. A brake control comprising a casing; a cylinder; means in said casing mounting said cylinder for longitudinal movement along its major axis; a piston in each end of said cylinder; means in said cylinder dividing it into two chambers; a brake actuating motor connected to each chamber; a brake mechanism to be operated by each brake actuating motor; individual actuating means for each piston; selectively operable means for engaging said cylinder for preventing movement relative to said casing, said brake control being constructed and arranged for permitting joint or selective operation of either of said brake motors, the joint operation of said motors being produced by either of said piston actuating means when said cylinder is free to move in said casing.

8. A brake control comprising a pair of brake assemblies, each of which is associated with the traction elements of a vehicle; a casing; a cylinder; means in said casing mounting said cylinder for longitudinal sliding movement along its major axis; means in said cylinder for forming a chamber in each end thereof, each chamber being connected to one of said brake assemblies; a piston in each of said chambers; individual actuating means for each piston; selectively operable means for engaging said cylinder for preventing relative motion with said casing, said brake control being constructed and arranged for selectively or simultaneously actuating said brake assemblies, simultaneous actuation of said brake assemblies being produced by either of said individual piston actuating means when said cylinder is movable relative to said casing.

9. A brake control comprising a cylinder; a casing; means mounting said cylinder in said casing for longitudinal sliding movement along its major axis; a piston in each end of said cylinder; means in said cylinder dividing it into two chambers; a brake operating motor connected to each chamber; a brake mechanism to be operated by each brake operating motor; individual actuating means for each piston; selectively operable means for engaging said cylinder for preventing longitudinal movement relative to said casing, said actuating means being constructed and arranged for selectively or simultaneously actuating said brake mechanism, simultaneous actuation being produced by either of said individual piston actuating means when said selectively operable means is disengaged from said cylinder.

10. A brake control comprising a brake assembly for each traction element of a vehicle; a casing; a cylinder having two chambers therein, each chamber operatively associated with one brake assembly; means in said casing mounting said cylinder for longitudinal sliding movement along its major axis; a piston slidably mounted in each chamber; selectively operable means for engaging said cylinder for preventing longitudinal sliding movement thereof; and individual actuating means for each piston and being selectively operable, said individual actuating means each enabling its associated piston to be selectively operated for individually operating each brake assembly when said selectively operable means engages said cylinder, either of said individual actuating means enabling both pistons to be jointly actuated, thereby jointly actuating each brake assembly when said selectively operable means is disengaged from said cylinder.

ARTHUR N. MILSTER.

REFERENCES CITED

The following references are of record in the file of this patent:

UNITED STATES PATENTS

| Number | Name | Date |
|---|---|---|
| 1,584,358 | Dement | May 11, 1926 |
| 1,824,062 | Winter | Sept. 22, 1931 |
| 2,115,558 | Noack | Apr. 26, 1938 |
| 2,362,521 | Acton | Nov. 14, 1944 |
| 2,367,194 | Boldt | Jan. 16, 1945 |
| 2,374,196 | Harbers | Apr. 24, 1945 |

FOREIGN PATENTS

| Number | Country | Date |
|---|---|---|
| 346,139 | Great Britain | Apr. 9, 1931 |